(12) United States Patent
Wang

(10) Patent No.: US 10,439,471 B2
(45) Date of Patent: Oct. 8, 2019

(54) DC MOTOR WITH ONE-WAY BEARING

(71) Applicant: ZHEJIANG CIPU POOL & SPA TECHNOLOGY CO., LTD., Ningbo (CN)

(72) Inventor: Huaiping Wang, Ningbo (CN)

(73) Assignee: ZHEJIANG CIPU POOL & SPA TECHNOLOGY CO., LTD., Ningbo (CN)

( * ) Notice: Subject to any disclaimer, the term of this patent is extended or adjusted under 35 U.S.C. 154(b) by 98 days.

(21) Appl. No.: 15/855,024

(22) Filed: Dec. 27, 2017

(65) Prior Publication Data

US 2018/0262082 A1    Sep. 13, 2018

(30) Foreign Application Priority Data

Mar. 8, 2017 (CN) ..................... 2017 2 0221271 U

(51) Int. Cl.
| | |
|---|---|
| *H02K 7/08* | (2006.01) |
| *H02K 7/00* | (2006.01) |
| *H02K 5/22* | (2006.01) |
| *H02K 7/108* | (2006.01) |
| *H02K 7/14* | (2006.01) |
| *H02P 7/03* | (2016.01) |
| *H02K 7/118* | (2006.01) |

(52) U.S. Cl.
CPC ............. *H02K 7/003* (2013.01); *H02K 5/22* (2013.01); *H02K 7/108* (2013.01); *H02K 7/14* (2013.01); *H02K 7/1185* (2013.01); *H02K 2213/12* (2013.01); *H02P 7/03* (2016.02)

(58) Field of Classification Search
CPC ............. H02K 7/00; H02K 5/22; H02K 7/108; H02K 7/14; H02K 7/003; H02K 7/1185; H02K 2213/12; H02P 7/03
USPC .................................................. 310/90, 90.5
See application file for complete search history.

(56) References Cited

U.S. PATENT DOCUMENTS

| | | | | |
|---|---|---|---|---|
| 5,593,294 A | * | 1/1997 | Houghtby ............... | F04C 28/28 188/82.6 |
| 8,772,958 B2 | * | 7/2014 | Kang ...................... | F03D 1/025 290/55 |
| 2009/0023529 A1 | * | 1/2009 | Sanji ...................... | B60K 6/365 475/5 |
| 2013/0221778 A1 | * | 8/2013 | Kusase .................. | H02K 16/02 310/78 |

* cited by examiner

*Primary Examiner* — Naishadh N Desai
(74) *Attorney, Agent, or Firm* — Charles C. Achkar; Ostrolenk Faber LLP

(57) ABSTRACT

A DC motor with a one-way bearing applicable for driving various different electrical products includes a chassis, a motor shaft, a front output shaft and a rear output shaft. Front and rear one-way bearings are installed between the front end of the motor shaft and the inner end of the front output shaft and between the rear end of the motor shaft and the inner end of the rear output shaft and they are rotated in opposite directions. In a power output mode, the forward rotation of the motor shaft drives the front output shaft to rotate in a forward direction synchronously while the rear output shaft remains still, or the reverse rotation of the motor shaft drives the rear output shaft to rotate in a reverse direction synchronously while the front output shaft remains still.

10 Claims, 2 Drawing Sheets

DC MOTOR WITH ONE-WAY BEARING

CROSS REFERENCE TO RELATED APPLICATION

The present application claims priority to Chinese Application No. 201720221271.9, filed on Mar. 8, 2017, the subject matter of which is incorporated by reference in its entirety.

FIELD OF INVENTION

The present invention relates to a direct current (DC) motor, in particular to the DC motor with a one-way bearing.

BACKGROUND OF INVENTION

1. Description of the Related Art

As we all know, DC motor refers to a rotary motor capable of converting DC power into mechanical energy, and it is primarily used for driving various different electrical products. The scope of applicability of the DC motor is very broad, and thus the DC motor may be divided into different types. For example, the DC motor may be divided into a single output shaft DC motor and a double output shaft DC motor according to the quantity of output shaft, wherein the double output shaft DC motor, as its name suggests, outputs power in two directions.

At present, the double output shaft DC motor generally has one motor shaft extended directly from both ends of the chassis, so that the two-direction power output by the forward and reverse rotations of the motor shaft may be in the same direction and synchronized. The double output shaft DC motor may be applied to some special electric products such as a sewage suction cleaner used for water pool underwater cleaning operation. If the aforementioned double output shaft DC motor is used for switching the direction of driving power, then when the forward and reverse rotations of the motor shaft outputs power in two direction, one end outputs power while the other end remains still. In other words, the two output shafts perform the forward and reverse rotations alternately for the output. Obviously, it is difficult for the conventional double output shaft DC motor to achieve this effect.

Undoubtedly, it is necessary to design a double output shaft DC motor capable of outputting power from one end while maintaining the other end still, or maintaining one end still while outputting power from the other end, so that the double output shaft DC motor can overcome the problem f the structural design of the aforementioned sewage suction cleaner, and this motor is applicable for various different electrical products that require the same power output, so as to expand the scope of use.

2. Summary of the Invention

Therefore, it is a primary objective of the present disclosure to overcome the aforementioned drawbacks of the prior art by providing a DC motor with a one-way bearing and capable of outputting power in two directions alternately.

To achieve the aforementioned and other objectives, the present disclosure provides a DC motor with a one-way bearing, comprising: a chassis, a motor shaft disposed in the chassis, and a front output shaft and a rear output shaft disposed at both ends of the chassis respectively, characterized in that a front one-way bearing is installed between the front end of the motor shaft and the inner end of the front output shaft, and a rear one-way bearing is installed between the rear end of the motor shaft and the inner end of the rear output shaft, and the front and rear one-way bearings are installed with a relation of rotating in opposite directions with respect to each other; the forward rotation of the motor shaft drives the front output shaft to rotate in the forward direction synchronously through the front one-way bearing and the rear output shaft remains still, or the reverse rotation of the motor shaft drives the rear output shaft to rotate in a reverse direction through the rear one-way bearing and the front output shaft remains still.

The front one-way bearing is embedded and fixed into the inner end of the front output shaft, and the front end of the motor shaft is rotated and supported in the front one-way bearing; and the rear one-way bearing is embedded and fixed into the inner end of the rear output shaft, and the rear end of the motor shaft is rotated and supported in the rear one-way bearing.

The inner end of the front output shaft has an inwardly opened bearing blind hole formed thereon, and the front one-way bearing is embedded and fixed into the bearing blind hole; and the inner end of the rear output shaft also has an inwardly opened bearing blind hole formed thereon, and the rear one-way bearing is embedded and fixed into the bearing blind hole.

The motor shaft, the front output shaft, and the rear output shaft are disposed on the same axis.

Both ends of the chassis have a front end cover and a rear end cover respectively, and the front end cover has a front bearing cavity formed thereon, and the rear end cover has a rear bearing cavity formed thereon.

The inner end of the front output shaft, the front one-way bearing, and the front end of the motor shaft are disposed in the front bearing cavity, and the front bearing cavity further has a rolling bearing for rotating and supporting the inner end of the front output shaft and the front end of the motor shaft; and the inner end of the rear output shaft, the rear one-way bearing, and the rear end of the motor shaft are disposed in the rear bearing cavity, and the rear bearing cavity further has a rolling bearing for rotating and supporting the inner end of the rear output shaft and the rear end of the motor shaft.

The front bearing cavity has an oil seal for sealing the inner end of the front output shaft, and the oil seal is installed on the outer side of the rolling bearing that rotates and supports the inner end of the front output shaft; and the rear bearing cavity has an oil seal for sealing the inner end of the rear output shaft, and the oil seal is installed on the outer side of the rolling bearing that rotates and supports the inner end of the rear output shaft.

The front bearing cavity is a one-chamber structure formed by extending the middle of the inner surface of front end cover into the chassis; and the rear bearing cavity is a one-chamber structure formed by extending the middle of the inner surface of the rear end cover into the chassis.

Both outer ends of the front output shaft and the rear output shaft have an impeller, and the impellers at the outer ends of the front and rear output shafts are rotated in opposite directions.

The chassis further comprises a stator, a brush, and an armature that constitute the DC motor.

Compared with the prior art, the present invention mainly installs the front and rear one-way bearings between the front end of the motor shaft and the inner end of the front output shaft and between the rear end of the motor shaft and the inner end of the rear output shaft, and the front and rear one-way bearings are installed such that they are rotated in opposite directions, so as to achieve the following power output mode: The forward rotation of the motor shaft drives the front output shaft to rotate in the forward direction synchronously while the rear output shaft remains still, or the reverse rotation of the motor shaft drives the rear output shaft to rotate in the reverse direction synchronously while the front output shaft remains still. In other words, the forward and reverse rotations of the motor shaft are used to achieve the effect of outputting power by the alternate forward and reverse rotations of the front and rear output shafts. Therefore, the improved DC motor with a one-way bearing can be used for outputting power for various different electrical products such as the sewage suction cleaner, so as to expand the use of the DC motor.

DESCRIPTION OF THE PREFERRED EMBODIMENTS

The above and other objects, features and advantages of this disclosure will become apparent from the following detailed description taken with the accompanying drawings.

Figure 1:
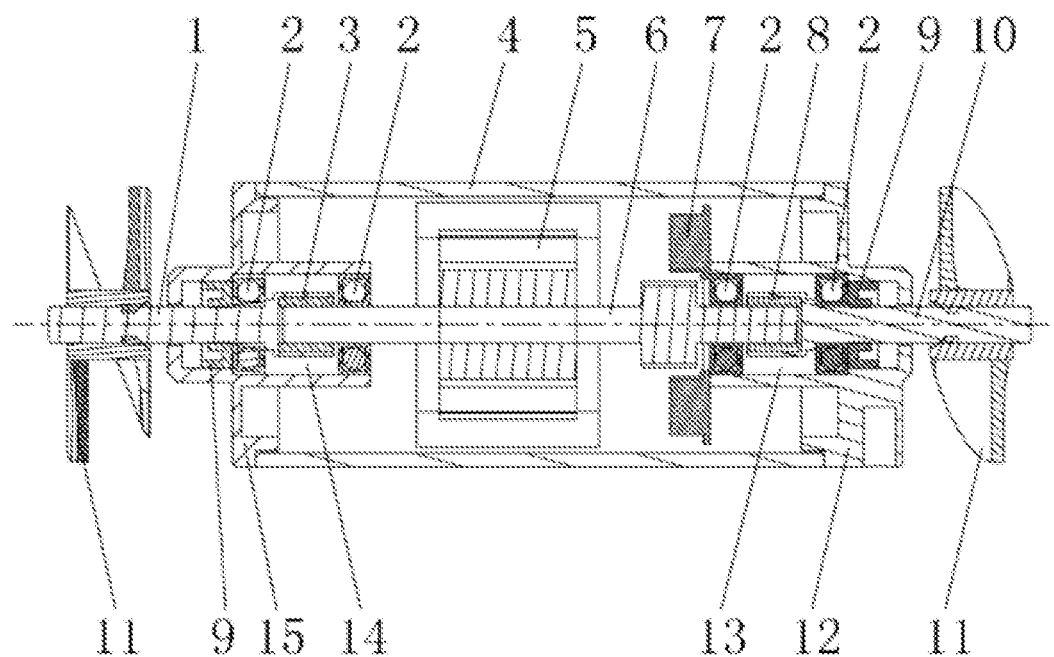
FIG. 1 is a cross-sectional view of the present invention.
Figure 2:
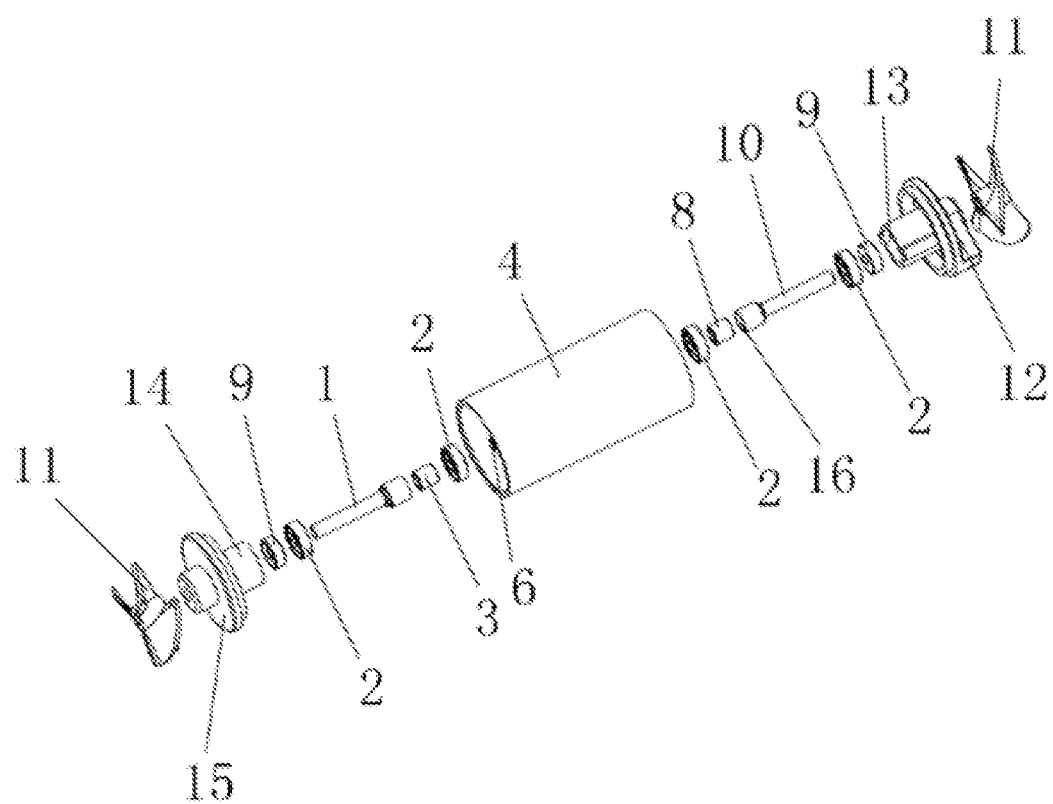
FIG. 2 is an exploded view of FIG. 1.

In FIGS. 1 and 2, related components are represented by the following numerals respectively: 1. Front output shaft; 2. Rolling bearing; 3. Front one-way bearing; 4. Chassis; 5. Armature; 6. Motor shaft; 7. Brush; 8. Rear one-way bearing; 9. Oil seal; 10. Rear output shaft; 11. Impeller; 12. Rear end cover; 13. Rear bearing cavity; 14. Front bearing cavity; 15. Front end cover; and 16. Bearing blind hole.

The DC motor with a one-way bearing relates to a power driving device capable of outputting power by the forward and reverse rotations of motor shaft, and specifically by the alternate forward and reverse rotations of the front and rear output shafts.

The DC motor of this preferred embodiment is disposed horizontally for its use. In FIG. 1, the left side is set as the front, and the right side is set as the rear. Of course, the DC motor may be disposed vertically or obliquely for its use in some occasions, and such arrangements will not affect the description of the structure of this preferred embodiment.

The DC motor with a one-way bearing comprises a chassis 4, a motor shaft 6, a front output shaft 1, a rear output shaft 10, a front one-way bearing 3, a rear one-way bearing 8, a front end cover 15, and a rear end cover 12.

The chassis 4 is a horizontal cylindrical structure, and the motor shaft 6 is horizontally disposed and installed in the chassis 4, and the chassis 4 and components including a stator, a brush 7, and an armature 5 constitute a complete DC motor, and the front end cover 15 and the rear end cover 12 are installed to both ends of the chassis 4 respectively for sealing the aforementioned components in the chassis 4.

The front end cover 15 has a front bearing cavity 14 formed thereon, and the front bearing cavity is a one-chamber structure formed by extending the middle of the inner surface of front end cover 15 horizontally into the chassis 4; and the rear bearing cavity (13) also has a rear bearing cavity 13 formed thereon and having the same structural design as the front end cover 15.

The front output shaft 1 and the rear output shaft 10 are installed at both ends of the chassis 4 respectively, wherein the inner end of the front output shaft 1 is extended into the front bearing cavity 14, and the front end of the corresponding motor shaft 6 is also extended into the front bearing cavity 14, and a front one-way bearing 3 is installed between the front end of the motor shaft 6 and the inner end of the front output shaft 1. Specifically, the inner end of the front output shaft 1 has an inwardly opened bearing blind hole 16, and the front one-way bearing 3 is embedded and fixed into the bearing blind hole 16, and the front end of the motor shaft 6 is rotated and supported in the front one-way bearing 3. In addition, the front bearing cavity 14 has a rolling bearing 2 installed therein for rotating and supporting the inner end of the front output shaft 1 and the front end of the motor shaft 6, wherein the rolling bearing is a 608 bearing having an oil seal 9 for sealing the inner end of the front output shaft 1, and the oil seal is installed on the outer side of the rolling bearing 2 that rotates and supports the inner end of the front output shaft 1.

Since the inner end of the front output shaft 1 and the front end of the motor shaft 6 are coupled through the front one-way bearing 3, the forward and reverse rotations of the motor shaft 6 may have the following two situations. If the front one-way bearing 3 is a one-way bearing rotating in the forward direction, then the forward rotation of the motor shaft 6 will be unable to drive the front output shaft 1 to rotate, so that the front output shaft will remain still. Therefore, only the reverse rotation of the motor shaft 6 can drive the front output shaft 1 to rotate in the reverse direction synchronously. If the front one-way bearing 3 is a one-way bearing rotating in the reverse direction, then the forward rotation of the motor shaft 6 will drive the front output shaft 1 to rotate in the forward direction synchronously, and the reverse rotation of the motor shaft 6 will be unable to drive the front output shaft to rotate, and the front output shaft 1 will remain still.

The inner end of the rear output shaft 10 is extended into the rear bearing cavity 13, and the rear end of the corresponding motor shaft 6 is also extended into the rear bearing cavity 13, and the two are coupled through a rear one-way bearing 8, and the structural design and installation method of the inner end of the rear output shaft 10, the rear one-way bearing 8, and the rear end of the motor shaft 6 are the same as those described above, and thus will not be repeated.

When the front output shaft 1 is coupled to the front end of the motor shaft 6 through the front one-way bearing 3, and the rear output shaft 10 is coupled to the rear end of the motor shaft 6 through the rear one-way bearing 8, the motor shaft 6, the front output shaft 1, and the rear output shaft 10 are situated on the same axis. In addition, the front and rear one-way bearings must be installed with a relation of rotating in opposite directions with respect to each other, so that when the motor shaft is rotated in the forward and reverse directions, the power can be outputted by the alternate forward and reverse rotations of the front and rear output shafts.

Output accessories may be installed to the outer end of the front output shaft 1 and the outer end of the rear output shaft 10 according to the occasion of actual use of the DC motor. For example, the impeller 11 in FIGS. 1 and 2 may be a clutch or a shaft, and the impellers at the outer ends of the front and rear output shafts are rotated in opposite directions, so that such DC motor is applicable to a sewage suction cleaner used for water pool underwater cleaning operation, and the sewage suction cleaner can be driven to complete the change of directions under water.

In the present invention, the front one-way bearing 3 is a one-way bearing rotated in the reverse direction, and the rear one-way bearing 8 is a one-way bearing rotated in the forward direction, and the operating process is described below: If the motor shaft 6 is rotated in the forward direction, and the front one-way bearing 3 drives the front output shaft 1 to rotate in the forward direction synchronously, then both of the rear one-way bearing 8 and the motor shaft 6 will be rotated in the forward direction, so that the rear output shaft 10 will remains still. If the motor shaft 6 is rotated in the reverse direction, and both of the front one-way bearing 3 and the motor shaft 6 are rotated in the reverse direction, then the front output shaft 1 will remain still, and the rear one-way bearing 8 will drive the rear output shaft 10 to rotate in the reverse direction synchronously.

While the invention has been described by means of specific embodiments, numerous modifications and variations could be made thereto by those skilled in the art without departing from the scope and spirit of the invention set forth in the claims.

What is claimed is:

1. A DC motor with a one-way bearing, comprising: a chassis (4), a motor shaft (6) disposed in the chassis, and a front output shaft (1) and a rear output shaft (10) disposed at both ends of the chassis respectively, characterized in that a front one-way bearing (3) is installed between the front end of the motor shaft (6) and the inner end of the front output shaft (1), and a rear one-way bearing (8) is installed between the rear end of the motor shaft (6) and the inner end of the rear output shaft (10), and the front and rear one-way bearings are installed with a relation of rotating in opposite directions with respect to each other; the forward rotation of the motor shaft (6) drives the front output shaft (1) to rotate in the forward direction synchronously through the front one-way bearing (3) and the rear output shaft (10) remains still, or the reverse rotation of the motor shaft (6) drives the rear output shaft (10) to rotate in a reverse direction through the rear one-way bearing (8) and the front output shaft (1) remains still.

2. The DC motor with a one-way bearing according to claim 1, wherein the front one-way bearing (3) is embedded and fixed into the inner end of the front output shaft (1), and the front end of the motor shaft (6) is rotated and supported in the front one-way bearing (3); and the rear one-way bearing (8) is embedded and fixed into the inner end of the rear output shaft (10), and the rear end of the motor shaft (6) is rotated and supported in the rear one-way bearing (8).

3. The DC motor with a one-way bearing according to claim 2, wherein the inner end of the front output shaft (1) has an inwardly opened bearing blind hole (16) formed thereon, and the front one-way bearing (3) is embedded and fixed into the bearing blind hole (16); and the inner end of the rear output shaft (10) also has an inwardly opened bearing blind hole (16) formed thereon, and the rear one-way bearing (8) is embedded and fixed into the bearing blind hole (16).

4. The DC motor with a one-way bearing according to claim 1, wherein the motor shaft (6), the front output shaft (1), and the rear output shaft (10) are disposed on the same axis.

5. The DC motor with a one-way bearing according to claim 1, wherein both ends of the chassis (4) have a front end cover (15) and a rear end cover (12) respectively, and the front end cover has a front bearing cavity (14) formed thereon, and the rear end cover has a rear bearing cavity (13) formed thereon.

6. The DC motor with a one-way bearing according to claim 5, wherein the inner end of the front output shaft (1), the front one-way bearing (3), and the front end of the motor shaft (6) are disposed in the front bearing cavity (14), and the front bearing cavity further has a rolling bearing (2) for rotating and supporting the inner end of the front output shaft (1) and the front end of the motor shaft (6); and the inner end of the rear output shaft (10), the rear one-way bearing (8), and the rear end of the motor shaft (6) are disposed in the rear bearing cavity (13), and the rear bearing cavity further has a rolling bearing (2) for rotating and supporting the inner end of the rear output shaft (10) and the rear end of the motor shaft (6).

7. The DC motor with a one-way bearing according to claim 6, wherein the front bearing cavity (14) has an oil seal (9) for sealing the inner end of the front output shaft (1), and the oil seal is installed on the outer side of the rolling bearing (2) that rotates and supports the inner end of the front output shaft (1); and the rear bearing cavity (13) has an oil seal (9) for sealing the inner end of the rear output shaft, and the oil seal is installed on the outer side of the rolling bearing (2) that rotates and supports the inner end of the rear output shaft (10).

8. The DC motor with a one-way bearing according to claim 5, wherein the front bearing cavity (14) is a one-chamber structure formed by extending the middle of the inner surface of front end cover (15) into the chassis (4); and the rear bearing cavity (13) is a one-chamber structure formed by extending the middle of the inner surface of the rear end cover (12) into the chassis (4).

9. The DC motor with a one-way bearing according to claim 1, wherein both outer ends of the front output shaft (1) and the rear output shaft (10) have an impeller (11), and the impellers at the outer ends of the front and rear output shafts are rotated in opposite directions.

10. The DC motor with a one-way bearing according to claim 1, wherein the chassis (4) further comprises a stator, a brush (7) and an armature (5) that constitute the DC motor.

* * * * *